(12) United States Patent
Huang

(10) Patent No.: US 9,535,832 B2
(45) Date of Patent: Jan. 3, 2017

(54) MULTI-HIERARCHY INTERCONNECT SYSTEM AND METHOD FOR CACHE SYSTEM

(71) Applicant: MediaTek Singapore Pte. Ltd., Singapore (SG)

(72) Inventor: Hsilin Huang, Cupertino, CA (US)

(73) Assignee: MediaTek Singapore Pte. Ltd., Singapore (SG)

( * ) Notice: Subject to any disclaimer, the term of this patent is extended or adjusted under 35 U.S.C. 154(b) by 88 days.

(21) Appl. No.: 14/254,898

(22) Filed: Apr. 17, 2014

(65) Prior Publication Data

US 2014/0325153 A1 Oct. 30, 2014

Related U.S. Application Data

(60) Provisional application No. 61/817,424, filed on Apr. 30, 2013.

(51) Int. Cl.
G06F 12/00 (2006.01)
G06F 12/06 (2006.01)
G06F 12/08 (2016.01)

(52) U.S. Cl.
CPC ....... *G06F 12/0607* (2013.01); *G06F 12/0846* (2013.01); *G06F 12/0897* (2013.01)

(58) Field of Classification Search
CPC .............. G06F 12/0607; G06F 12/0846; G06F 12/0897
See application file for complete search history.

(56) References Cited

U.S. PATENT DOCUMENTS

| 4,839,801 | A | * | 6/1989 | Nicely | ................ G06F 15/8092 710/35 |
| 6,192,451 | B1 | | 2/2001 | Arimilli | |
| 2007/0156946 | A1 | | 7/2007 | Lakshmanamurthy | |
| 2008/0109606 | A1 | * | 5/2008 | Lataille | .................. G06F 12/12 711/133 |

(Continued)

FOREIGN PATENT DOCUMENTS

| CN | 101211321 A | 7/2008 |
| CN | 103257946 A | 8/2013 |

OTHER PUBLICATIONS

"International Search Report" mailed on Sep. 23, 2014 for International application No. PCT/US14/35379, International filing date: Apr. 25, 2014.

*Primary Examiner* — Gurtej Bansal
(74) *Attorney, Agent, or Firm* — Winston Hsu; Scott Margo

(57) ABSTRACT

A multi-hierarchy interconnect system for a cache system having a tag memory and a data memory includes an address interconnect scheduling device and a data interconnect scheduling device. The address interconnect scheduling device performs a tag bank arbitration to schedule address requests to a plurality of tag banks of the tag memory. The data interconnect scheduling device performs a data bank arbitration to schedule data requests to a plurality of data banks of the data memory. Besides, a multi-hierarchy interconnect method for a cache system having a tag memory and a data memory includes: performing a tag bank arbitration to schedule address requests to a plurality of tag banks of the tag memory, and performing a data bank arbitration to schedule data requests to a plurality of data banks of the data memory.

20 Claims, 8 Drawing Sheets

(56) References Cited

U.S. PATENT DOCUMENTS

| | | |
|---|---|---|
| 2008/0162852 A1 | 7/2008 | Kareenahalli |
| 2009/0006718 A1 | 1/2009 | Blumrich |
| 2010/0169578 A1 | 7/2010 | Nychka |
| 2010/0325370 A1 | 12/2010 | Cummings |
| 2014/0032845 A1* | 1/2014 | Avudaiyappan .... G06F 12/0846 711/122 |

* cited by examiner

FIG. 11

MULTI-HIERARCHY INTERCONNECT SYSTEM AND METHOD FOR CACHE SYSTEM

CROSS REFERENCE TO RELATED APPLICATIONS

This application claims the benefit of U.S. provisional application No. 61/817,424, filed on Apr. 30, 2013 and incorporated herein by reference.

BACKGROUND

The disclosed embodiments of the present invention relate to accessing buffered data (e.g., cached data), and more particularly, to a multi-hierarchy interconnect system and method for a cache system having a tag memory and a data memory.

In today's systems, the time it takes to bring data (e.g., instructions) into a processor is very long when compared to the time to process the data. Therefore, a bottleneck forms at the input to the processor. The cache memory helps by decreasing the time it takes to move data to and from the processor. A read request may be served by the cache memory. When the cache memory contains the data requested by the read request, the transaction is said to be a cache hit. When the cache memory does not contain the information requested by the read request, the transaction is said to be a cache miss. Besides, a write request may also be served by the cache memory.

Recently, a multi-core or multi-processor design has become a common practice in the modern computing applications. Concerning the cache memory shared by multiple agents, it is required to serve read requests and write requests issued from these agents. Thus, there is a need for an interconnect fabric between the agents and shared cache memory to properly schedule the read requests and the write requests.

SUMMARY

In accordance with exemplary embodiments of the present invention, a multi-hierarchy interconnect system and method for a cache system having a tag memory and a data memory are proposed. The proposed multi-hierarchy interconnect scheduling supports a mixed data layout to achieve high bandwidth and high cache locality.

According to a first aspect of the present invention, an exemplary multi-hierarchy interconnect system for a cache system having a tag memory and a data memory is disclosed. The multi-hierarchy interconnect system includes an address interconnect scheduling device and a data interconnect scheduling device. The address interconnect scheduling device is arranged to perform a tag bank arbitration to schedule address requests to a plurality of tag banks of the tag memory. The data interconnect scheduling device is arranged to perform a data bank arbitration to schedule data requests to a plurality of data banks of the data memory.

According to a second aspect of the present invention, an exemplary multi-hierarchy interconnect method for a cache system having a tag memory and a data memory is disclosed. The exemplary multi-hierarchy interconnect method includes: performing a tag bank arbitration to schedule address requests to a plurality of tag banks of the tag memory; and performing a data bank arbitration to schedule data requests to a plurality of data banks of the data memory.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 11 is a diagram illustrating a first layout of stored data in data banks of the data memory according to an embodiment of the present invention.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

One key technical feature of the present invention is using multi-hierarchy interconnect scheduling for providing address request scheduling and data request scheduling separately, thus reducing the placement and layout complexity. Another key technical feature of the present invention is separating read requests and write requests into different ports instead of combining read requests and write requests into the same port, thus allowing parallel processing of the read operation and the write operation to increase the throughput bandwidth. Further details are described as below.

Figure 1:
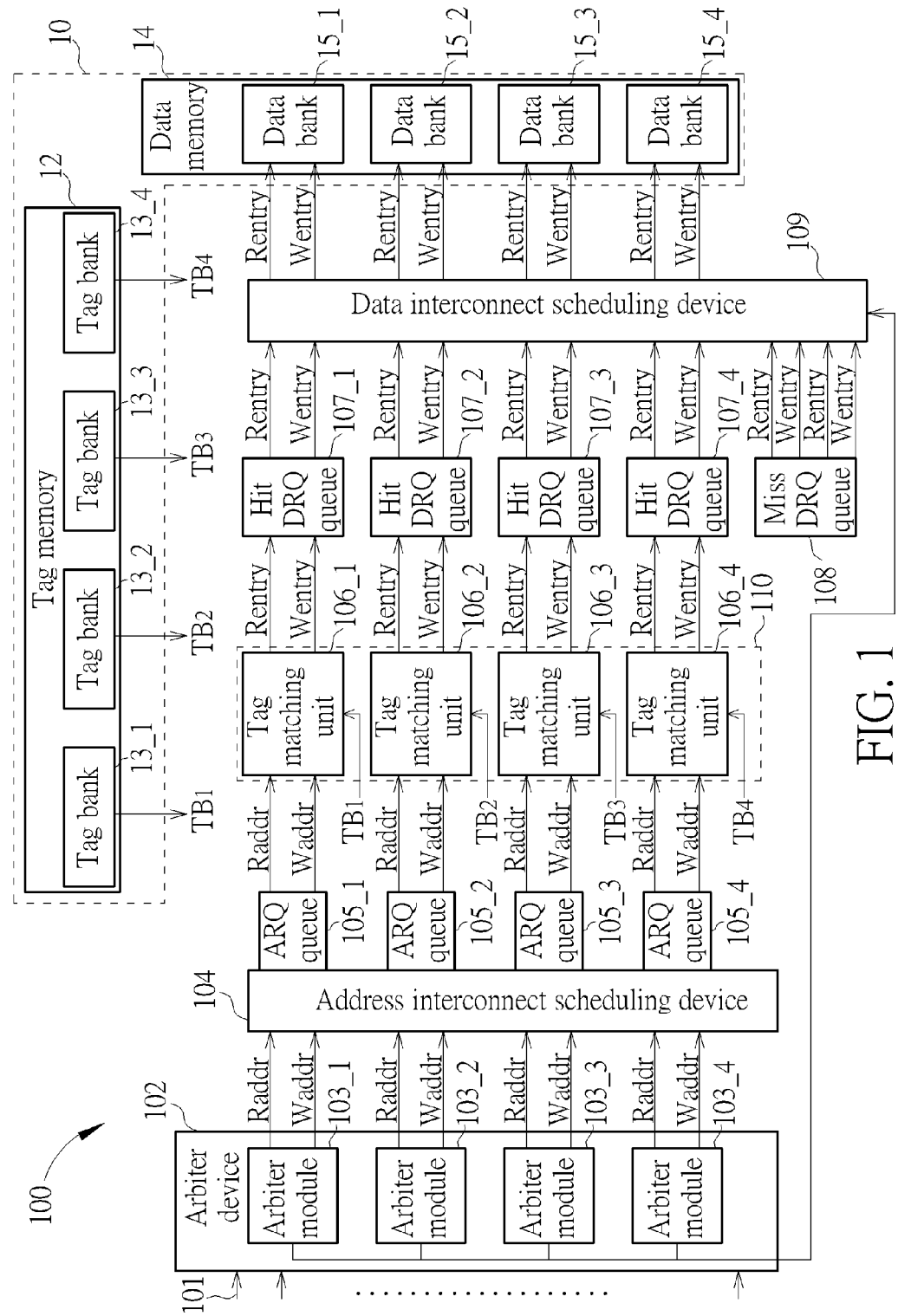
FIG. 1 is a block diagram illustrating a multi-hierarchy interconnect system according to an embodiment of the present invention.

FIG. 1 is a block diagram illustrating a multi-hierarchy interconnect system according to an embodiment of the present invention. The multi-hierarchy interconnect system 100 is capable of supporting separate address request scheduling and data request scheduling for reading data from and writing data into a cache system 10. Specifically, regarding each of the read requests for read operations of the cache data memory and write requests for write operations of the cache data memory, the address request scheduling is followed by the data request scheduling. As shown in FIG. 1, the cache system 10 includes a tag memory 12 and a data memory 14, each having a plurality of banks that can be accessed individually. For example, the data memory 14 used for storing cached data (e.g., cached instructions) includes data banks 15_1, 15_2, 15_3, 15_4, and the tag memory 12 used for storing tags (i.e., partial memory addresses) includes tag banks 13_1, 13_2, 13_3, 13_4. The address request scheduling schedules and dispatches address requests to the tag banks 13_1-13_4 for tag matching test (i.e., cache hit/miss detection), and the data request scheduling schedules and dispatches data requests to data banks 15_1-15_4 for cache data access. It should be noted that the number of tag banks in the tag memory 12 and the number of data banks in the data memory 14 are for illustrative purposes only, and are not meant to be limitations of the present invention.

Regarding the multi-hierarchy interconnect system 100, it includes an arbiter device 102 having a plurality of arbiter modules 103_1, 103_2, 103_3, 103_4 included therein, an address interconnect scheduling device 104, a plurality of address request (ARQ) queues 105_1, 105_2, 105_3, 105_4, a tag matching device 110 having a plurality of tag matching units 106_1, 106_2, 106_3, 106_4 included therein, a plurality of hit data request (DRQ) queues 107_1, 107_2, 107_3, 107_4, a miss DRQ queue 108, and a data interconnect scheduling device 109. The cache system 10 is shared by a plurality of agents. Hence, the arbiter device 102 is coupled to the agents via a plurality of input ports 101, and arranged to act as an interface for receiving read requests and write requests issued from the agents. Each of the read requests and the write requests may be processed in terms of an address request (Raddr for read operation or Waddr for write operation) for tag matching test and a data request (Rentry for read operation or Wentry for write operation) for actual cache data access. For example, the address request indicates a memory address to be read by a read request or written by a write request, and the data request demands data to be read from or written into a memory space located at the memory address designated by the read/write request.

Figure 2:
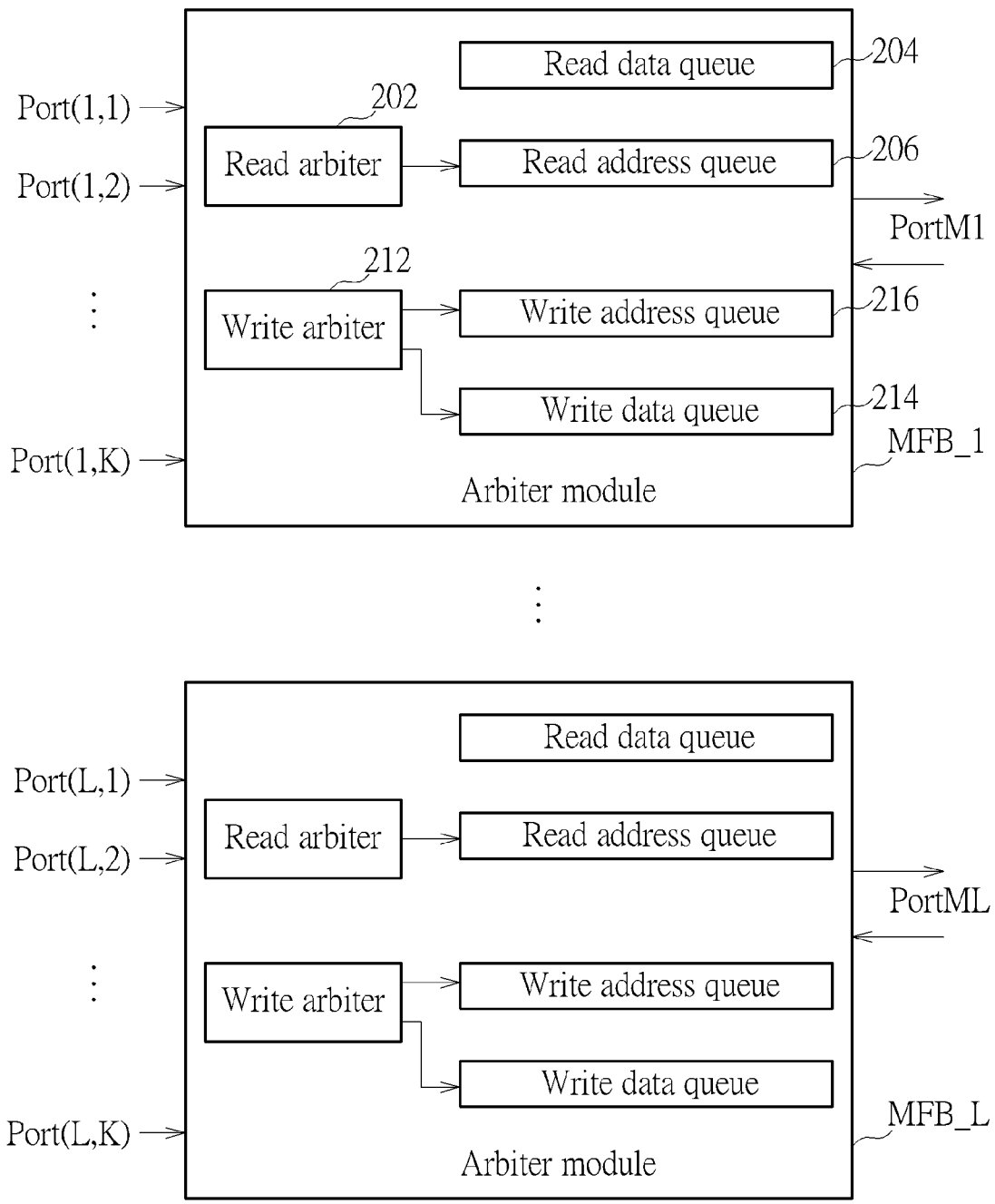
FIG. 2 is a diagram illustrating an exemplary design of the arbiter device shown in FIG. 1.

To reduce the physical layout complexity, several input ports 101 may be merged at each of the arbiter modules 103_1-103_4. Please refer to FIG. 2, which is a diagram illustrating an exemplary design of the arbiter device 102 shown in FIG. 1. As shown in FIG. 2, K*L input ports Port (1, 1), Port (1, 2), . . . Port (L, K) are merged into L output ports PortM1-PortML. Specifically, K input ports become 1 output port, and then connect to the next interconnect fabric network (e.g., the address interconnect scheduling device 104 shown in FIG. 1). In a case where the proposed multi-hierarchy interconnect system employs separate processing of read requests and write requests, each of the arbiter modules MFB_1- MFB_L (e.g., arbiter modules 103_1-103_4 shown in FIG. 1) is configured to include a plurality of arbiters, a plurality of address queues, and a plurality of data queues. The arbiters have a read arbiter 202 for read request arbitration, and a write arbiter 212 for write request arbitration. The address queues have a read address queue 206 for storing read address requests of the arbitrated read requests, and a write address queue 216 for storing write address requests of the arbitrated write requests. The data queues have a read data queue 204 for storing read data obtained from the data memory 14 of the cache system 10, and a write data queue 214 for storing write data to be written into the data memory 14 of the cache system 10. Specifically, the read arbiter 202 is arranged to perform arbitration upon incoming read requests received by the input ports Port(1, 1)-Port(1, K), and store read address requests (i.e., memory addresses designated by the received read requests) in the read address queue 206 according to the arbitration result. The write arbiter 212 is arranged to perform arbitration upon incoming write requests received by the input ports Port(1, 1)-Port(1, K), and store write address requests (i.e., memory addresses designated by the received write requests) in the write address queue 216 according to the arbitration result.

Each of the address queues and data queues may be implemented using a shared buffer or separate first-in first-out (FIFO) buffers. By way of example, but not limitation, the shared buffer or the FIFO buffers may be implemented using D-type flip-flops (DFFs), static random access memory (SRAM) cells, or dynamic random access memory (DRAM) cells.

Figure 3:
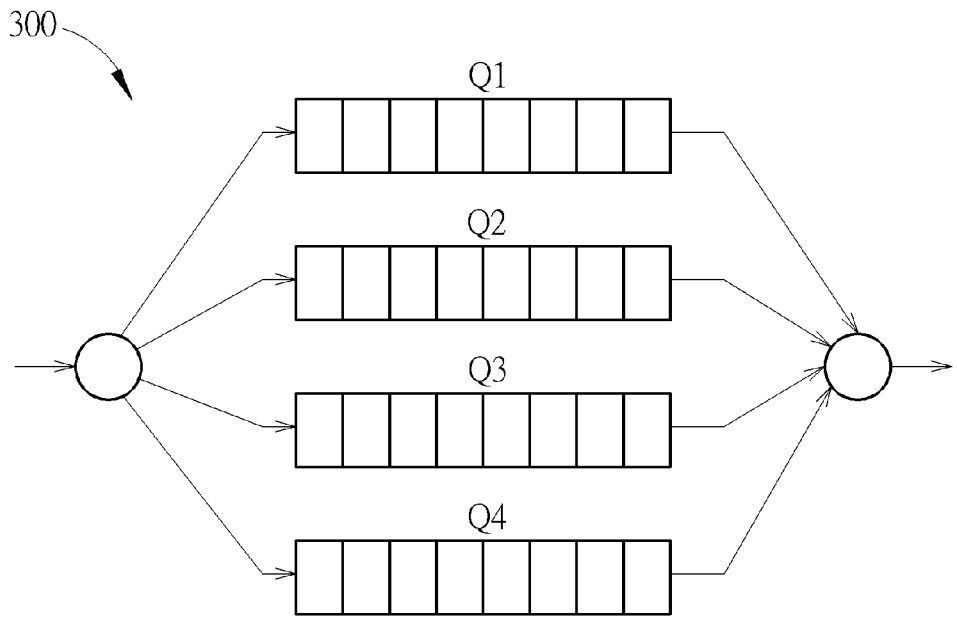
FIG. 3 is a diagram illustrating a first exemplary design of a queue shown in FIG. 2.

Please refer to FIG. 3, which is a diagram illustrating a first exemplary design of a queue shown in FIG. 2. In this embodiment, the number of FIFO buffers implemented in a queue is equal to the number of data banks included in the cache data memory. As shown in FIG. 1, the data memory 14 is partitioned into four data banks 15_1-15_4. Hence, four virtual output queues (VOQs) Q1, Q2, Q3, Q4 are included in the queue 300 to act as FIFO buffers corresponding to the data banks 15_1-15_4 respectively. For example, when the read address queue 206 is implemented using the queue 300, a read address request with a memory address of the data bank 15_1 is pushed into the first VOQ Q1, a read address request with a memory address of the data bank 15_2 is pushed into the second VOQ Q2, a read address request with a memory address of the data bank 15_3 is pushed into the third VOQ Q3, and a read address request with a memory address of the data bank 15_4 is pushed into the fourth VOQ Q4. For another example, when the write address queue 216 is implemented using the queue 300, a write address request with a memory address of the data bank 15_1 is pushed into the first VOQ Q1, a write address request with a memory address of the data bank 15_2 is pushed into the second VOQ Q2, a write address request with a memory address of the data bank 15_3 is pushed into the third VOQ Q3, and a write address request with a memory address of the data bank 15_4 is pushed into the fourth VOQ Q4. To put it simply, each of the VOQs Q1-Q4 is arranged to store address requests for data access of the same data bank only.

Figure 4:
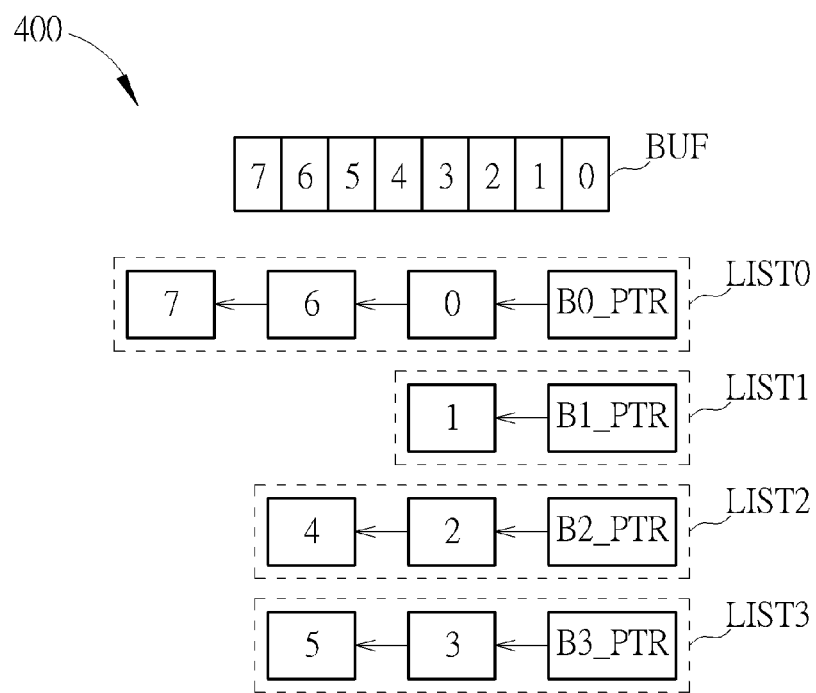
FIG. 4 is a diagram illustrating a second exemplary design of a queue shown in FIG. 2.

Please refer to FIG. 4, which is a diagram illustrating a second exemplary design of a queue shown in FIG. 2. The queue 400 includes a shared buffer BUF which is not a FIFO buffer, and further includes a plurality of linked lists created and maintained by a corresponding arbiter. The number of linked lists implemented in the queue 400 is equal to the number of data banks included in the cache data memory. As shown in FIG. 1, the data memory 14 is partitioned into four data banks 15_1-15_4. Hence, four linked lists LIST0, LIST1, LIST2, LIST3 are maintained by a corresponding arbiter. The address requests are allowed to be freely stored in any available entries in the shared buffer BUF. However, stored address requests in the shared buffer BUF for data access of the same data bank are pointed to by pointers included in the corresponding linked list. For example, when the read address queue 206 is implemented using the queue 400, a read address request with a memory address of the data bank 15_1 is stored in an available entry in the shared buffer BUF and indicated by a pointer added to the linked list LIST0, a read address request with a memory address of the data bank 15_2 is stored in an available entry in the shared buffer BUF and indicated by a pointer added to the linked list LIST1, a read address request with a memory address of the data bank 15_3 is stored in an available entry in the shared buffer BUF and indicated by a pointer added to the linked list LIST2, and a read address request with a memory address of the data bank 15_4 is stored in an available entry in the shared buffer BUF and indicated by a pointer added to the linked list LIST3. For another example, when the write address queue 216 is implemented using the queue 400, a write address request with a memory address of the data bank 15_1 is stored in an available entry in the shared buffer BUF and indicated by a pointer added to the linked list LIST0, a write address request with a memory address of the data bank 15_2 is stored in an available entry in the shared buffer BUF and indicated by a pointer added to the linked list LIST1, a write address request with a memory address of the data bank 15_3 is stored in an available entry in the shared buffer BUF and indicated by a pointer added to the linked list LIST2, and a write address request with a memory address of the data bank 15_4 is stored in an available entry in the shared buffer BUF and indicated by a pointer added to the linked list LIST3.

To put it simply, based on each of the linked lists, requests for data access of the same bank can be orderly retrieved from the shared buffer BUF though the requests are not orderly stored in the shared buffer BUF. The arbiter can maintain a linked list to trace the requests for each destination data bank with the use of only one buffer. Hence, the combination of the shared buffer BUF and the liked list LIST0 is equivalent to a first FIFO buffer (i.e., VOQ Q1) in FIG. 3; the combination of the shared buffer BUF and the liked list LIST1 is equivalent to a second FIFO buffer (i.e., VOQ Q2) in FIG. 3; the combination of the shared buffer BUF and the liked list LIST2 is equivalent to a third FIFO buffer (i.e., VOQ Q3) in FIG. 3; and the combination of the shared buffer BUF and the liked list LIST3 is equivalent to a fourth FIFO buffer (i.e., VOQ Q4) in FIG. 3. However, compared to the exemplary FIFO-based design shown in FIG. 4, the linked-list based design shown in FIG. 4 is capable of reducing the production cost and the design complexity.

As shown in FIG. 2, the read address requests and the write address requests are processed, separately. In this way, the proposed architecture can serve the read operation and the write operation simultaneously at the same cycle of the same data bank, thus achieving 2× throughput bandwidth. In contrast to the conventional design having a single address port for transmitting read address requests and write address requests, the proposed architecture uses two address ports for transmitting read address requests and write address requests respectively. For example, a write address port is used to transmit a write address request for writing data into a cache data memory, and then a read address port is used to transmit a read address request for reading written data from the cache data memory. However, when a read address request of a received read request and a write address request of a granted write request have the same address value, it is possible that, in the same cycle, the read operation and the write operation are performed upon the same memory space in the cache data memory. As a result, the data to be written by the write operation will not be correctly read back by the read operation. In a preferred embodiment, the read arbiter 202 is further configured to have a RAW (read after write) detection capability. More specifically, the read arbiter 202 detects if there are a read address request of a received read request and a write address request of a granted write request having the same address value. When it is detected that the read address request of the received read request and the write address request of the granted write request have the same address value (i.e., a RAW hazard occurs), the read arbiter 202 blocks the read address request from being scheduled by the following address interconnect scheduling device 104 until a write operation for serving the granted write request is completed. In other words, the read operation of a memory address is ensured to be performed after the currently granted write operation of the same memory address is done, thus avoiding the undesired RAW hazard.

In some designs of the present invention, the read arbiter 202 arbitrates read address requests into the read address queue 206 based on at least one of traffic condition of the data banks 15_1-15_4 and storage condition of the read address queue 206; and the write arbiter 212 arbitrates write address requests into the write address queue 216 based on at least one of traffic condition of the data banks 15_1-15_4 and storage condition of the write address queue 216. Therefore, when one destination data bank is in congestion, the read arbiter 206/write arbiter 212 may try to accept a read address request/write address request for a different data bank.

Figure 5:
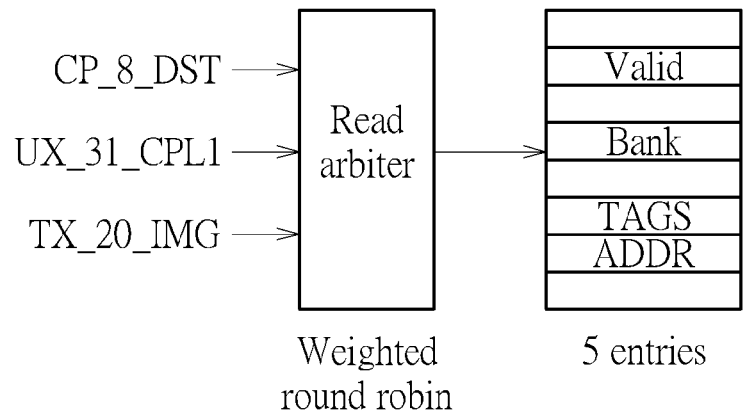
FIG. 5 is a diagram illustrating an example of the read arbiter shown in FIG. 2.
Figure 6:
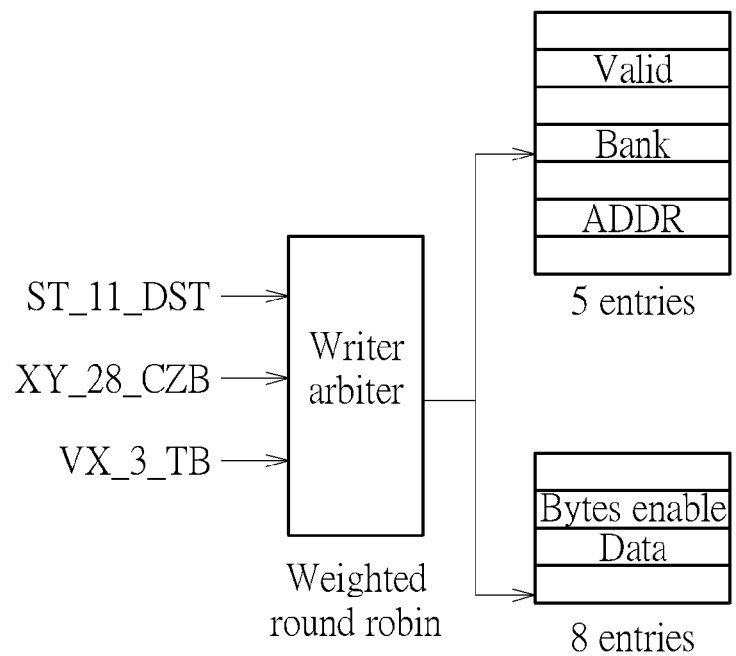
FIG. 6 is a diagram illustrating an example of the write arbiter shown in FIG. 2.

In some designs of the present invention, each of the read arbiter 202 and the write arbiter 212 may employ a weighted round robin scheme to perform the address request arbitration. For example, each of the read arbiter 202 and the write arbiter 212 assigns weighting values to input ports Port (1, 1)-Port (1, K) of the arbiter module MFB_1, and arbitrates address requests based on the weighting values. Please refer to FIG. 5 and FIG. 6. FIG. 5 is a diagram illustrating an example of the read arbiter 202 shown in FIG. 2, and FIG. 6 is a diagram illustrating an example of the write arbiter 212 shown in FIG. 2. The weighting value of each channel (i.e., each input port) may be programmed to be either "1" or "2". For example, CP_8_DST is assigned with a weighting value "1", UX_31_CPL1 is assigned with a weighted value "2", and TX_20_IMG is assigned with a weighted value "1". Hence, there is 50% granted to UX_31_CPL1 when all channels CP_8_DST, UX_31_CPL1, TX_20_IMG have read requests to be arbitrated by the read arbiter at the same time. For another example, ST_11_DST is assigned with a weighting value "1", XY_28_CZB is assigned with a weighted value "2", and VX_3_TB is assigned with a weighted value "1". Hence, there is 50% granted to XY_28_CZB when all channels ST_11_DST, XY_28_CZB, VX_3_TB have write requests to be arbitrated by the write arbiter at the same time. It should be noted that the weighted values can be dynamically adjusted to fine tune the best performance.

The present invention may further support section programming in the read arbiter 202 and the write arbiter 212. The following table shows an exemplary design of programmable section sizes of a cache data memory.

| Entries (Addresses) | Bank0 (2 × 128 bits) | Bank1 (2 × 128 bits) | Bank2 (2 × 128 bits) | Bank3 (2 × 128 bits) |
| --- | --- | --- | --- | --- |
| 480-511 | Sec12 | Sec12 | Sec12 | Sec12 |
| 448-479 | Sec12 | Sec12 | Sec12 | Sec12 |

-continued

| Entries (Addresses) | Bank0 (2 × 128 bits) | Bank1 (2 × 128 bits) | Bank2 (2 × 128 bits) | Bank3 (2 × 128 bits) |
|---|---|---|---|---|
| 416-447 | Sec12 | Sec12 | Sec12 | Sec12 |
| 384-415 | Sec12 | Sec12 | Sec12 | Sec12 |
| 352-383 | Sec11 | Sec11 | Sec11 | Sec11 |
| 320-351 | Sec10 | Sec10 | Sec10 | Sec10 |
| 288-319 | Sec9 | Sec9 | Sec9 | Sec9 |
| 256-287 | Sec8 | Sec8 | Sec8 | Sec8 |
| 224-255 | Sec6 | Sec6 | Sec6 | Sec6 |
| 192-223 | Sec5 | Sec5 | Sec5 | Sec5 |
| 160-191 | Sec4 | Sec4 | Sec4 | Sec4 |
| 128-159 | Sec4 | Sec4 | Sec4 | Sec4 |
| 96-127 | Sec3 | Sec3 | Sec3 | Sec3 |
| 64-95 | Sec2 | Sec2 | Sec2 | Sec2 |
| 32-63 | Sec1 | Sec1 | Sec1 | Sec1 |
| 0-31 | Sec0 | Sec0 | Sec0 | Sec0 |

The data memory 14 shown in FIG. 1 may be divided into a plurality of sections according to section sizes as defined in above table. It should be noted that the size of each section is programmable. Besides, each section is an N-way set associative cache having its own sets and ways. Thus, the tag matching is independent in each section. The arbiter device 102 (especially, the read arbiter and write arbiter of each arbiter module) maps address requests received from one channel (i.e., one input port) to one section. Specifically, address requests received from a first input port are mapped to a first section, and address requests received from a second input port are mapped to a second section different from the first section. For example, read requests of CP_8_DST are mapped to section sec0, read requests of UX_31_CPL1 are mapped to section sec5, and read requests of TX_20_IMG are mapped to the section sec8. To put it simply, each section would have its own tag matching and cache memory access. Further, each section could support different layouts of stored data, such as a parallel data layout and a serial data layout will be detailed later, and may be programmed to adopt one of the supported data layouts.

Figure 7:
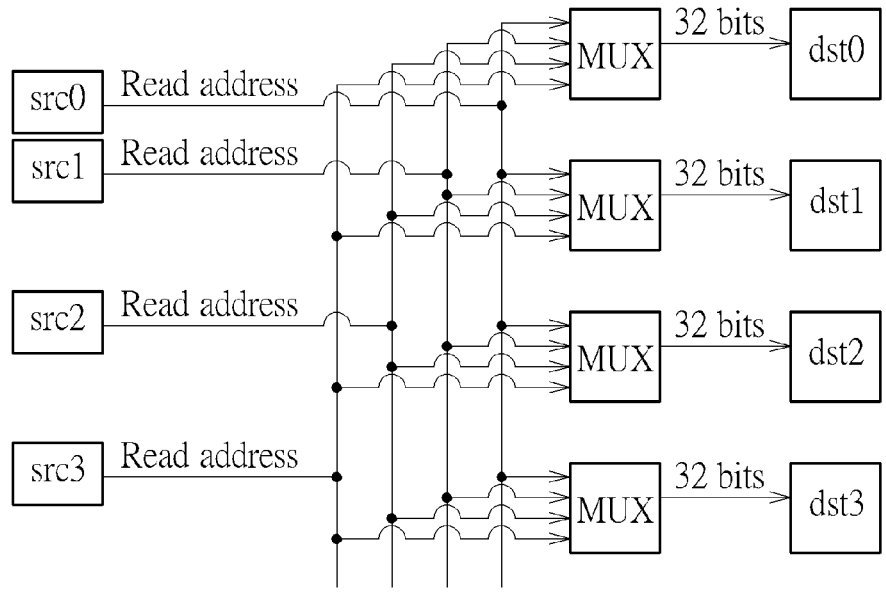
FIG. 7 is a diagram illustrating a read address XBAR switch in the address interconnect scheduling device shown in FIG. 1.
Figure 8:
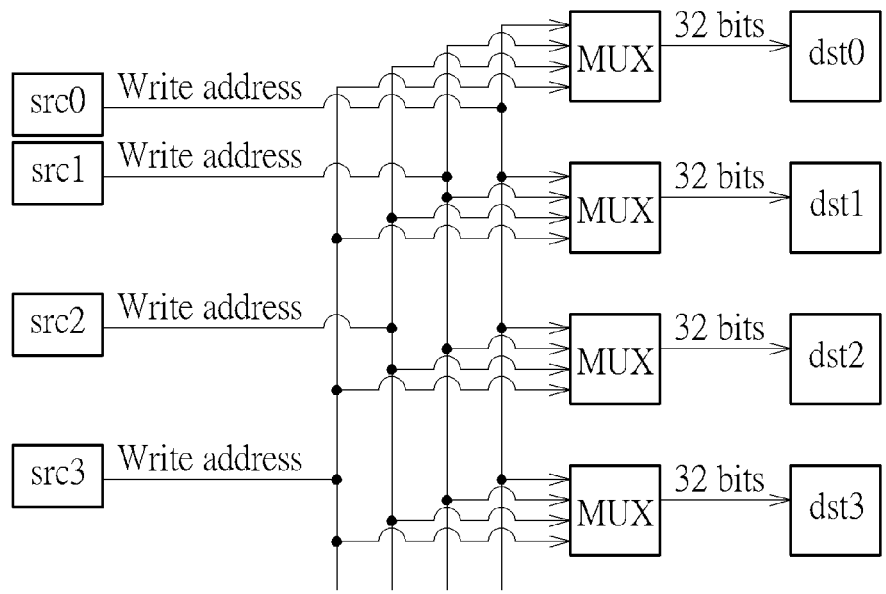
FIG. 8 is a diagram illustrating a write address XBAR switch in the address interconnect scheduling device shown in FIG. 1.

Please refer to FIG. 1 again. Each of the arbiter modules 103_1-103_4 outputs read address requests and write address requests to the address interconnect scheduling device 104. The address interconnect scheduling device 104 is arranged to perform a tag bank arbitration to schedule address requests, including read address requests and write address requests, to the tag banks 13_1-13_4 in the tag memory 12 for tag matching test. In this embodiment, the address interconnect scheduling device 104 may be implemented using a crossbar (XBAR) structure. FIG. 7 is a diagram illustrating a read address XBAR switch in the address interconnect scheduling device 104 shown in FIG. 1. FIG. 8 is a diagram illustrating a write address XBAR switch in the address interconnect scheduling device 104 shown in FIG. 1. As the address interconnect scheduling device 104 separates read address processing and write address processing, the read address XBAR switch and the write address XBAR switch can be both active at the same time, where each of the multiplexers (MUXs) in FIG. 7 and FIG. 8 is controlled by address scheduling. As shown in FIG. 7, each of the MUXs has a plurality of input ports coupled to a plurality of source devices (e.g., src0, src1, src2, and src3), respectively, and further has one output port coupled to a corresponding destination device (e.g., dst0, dst1, dst2, or dst3). Thus, by properly controlling the MUXs based on read address scheduling, one destination device can receive one read address from one of the source devices. As shown in FIG. 8, each of the MUXs has a plurality of input ports coupled to a plurality of source devices (e.g., src0, src1, src2, and src3), respectively, and further has one output port coupled to a corresponding destination device (e.g., dst0, dst1, dst2, or dst3). Thus, by properly controlling the MUXs based on write address scheduling, one destination device can receive one write address from one of the source devices. However, this is for illustrative purposes only, and is not meant to be a limitation of the present invention. That is, the address interconnect scheduling device 104 may be implemented using other interconnect structure.

Since the number of tag banks 13_1-13_4 is equal to 4, two bits of the read/write address are used to differentiate between the tag banks 13_1-13_4. In a case where a set-associative scheme is employed by the cache system 10, a 32-bit memory address designated by a read/write request may have bits acting as a tag, bits acting as a line/set selector, bits acting as a bank selector, and bits acting as a line offset. For example, address bits [8:7] in each read/write address request are used to determine which tag bank is used to do the tag matching test for the read/write address request. When address bits [8:7] is equal to 2'b00, the read/write address request is stored into the ARQ queue 105_1; when address bits [8:7] is equal to 2'b01, the read/write address request is stored into the ARQ queue 105_2; when address bits [8:7] is equal to 2'b10, the read/write address request is stored into the ARQ queue 105_3; and when address bits [8:7] is equal to 2'b11, the read/write address request is stored into the ARQ queue 105_4. Therefore, we can treat the cache hit/miss per tag bank without involving the result from other tag banks.

Each of the ARQ queues 105_1-105_4 may be configured to have two parallel address queues (i.e., distinct FIFO buffers) to deal with read addresses and write addresses concurrently. As shown in FIG. 1, each of the ARQ queues 105_1-105_4 has one read address port for outputting the queued read address requests Raddr (which are composed of read addresses designated by read requests issued from agents) and one write address port for outputting the queued write address requests Waddr (which are composed of write addresses designated by write requests issued from agents). Besides, the ARQ queue 105_1 outputs read/write address requests to the tag matching unit 106_1 for cache hit/miss detection, the ARQ queue 105_2 outputs read/write address requests to the tag matching unit 106_2 for cache hit/miss detection, the ARQ queue 105_3 outputs read/write address requests to the tag matching unit 106_3 for cache hit/miss detection, and the ARQ queue 105_4 outputs read/write address requests to the tag matching unit 106_4 for cache hit/miss detection. Hence, the tag matching device 110 applies tag matching tests (i.e., cache hit/miss detections) to address requests scheduled to different tag banks, independently. More specifically, since each of the ARQ queues 105_1-105_4 is allowed to simultaneously output one read address request and one write address request to the following tag matching unit 106_1/106_2/106_3/106_4, each of the tag matching units 106_1-106_4 may be configured to have two independent tag matching circuits, where one tag matching circuit is used to apply a tag matching test to one read address request to decide if requested read data of the corresponding read request can be directly read from the read address in the data memory 14, and the other tag matching circuit is used to apply a tag matching test to one write address request to decide if requested write data of the corresponding write request can be directly written into the write address in the data memory 14.

As mentioned above, each of the tag matching units 106_1-106_4 is equipped with two independent tag matching circuits. When an ARQ queue can provide one read address request and one write address request to a following tag matching unit concurrently, two independent tag matching circuits are fully used to generate a read request cache hit/miss result and a write request cache hit/miss result in parallel. However, when the ARQ queue can only provide one read address request (or one write address request) to the following tag matching unit concurrently, only a first half of the two independent tag matching circuits is operative to generate a read request cache hit/miss result (or a write request cache hit/miss result), while a second half of the two independent tag matching circuits is idle. This results in degraded tag matching performance. To ensure that the two independent tag matching circuits in each tag matching unit are fully used, the address interconnect scheduling device 104 may be further arranged to balance read address requests and write address requests scheduled to the same tag bank based on the credit status of read and write queues in an ARQ queue and feedback of data scheduling.

When a cache hit event of a read address request is detected by the tag matching unit 106_1/106_2/106_3/106_4, a "hit" read data request Rentry is stored into the following hit DRQ queue 107_1/107_2/107_3/107_3 correspondingly; besides, when a cache hit event of a write address request is detected by the tag matching unit 106_1/106_2/106_3/106_4, a "hit" write data request Wentry is stored into the following hit DRQ queue 107_1/107_2/107_3/107_4 correspondingly. As each of the tag matching units 106_1-106_4 may be configured to have two independent tag matching circuits, each of the hit DRQ queues 107_1-107_4 may also be configured to have two parallel queues (i.e., distinct FIFO buffers) to deal with "hit" read data requests Rentry and "hit" write data requests Wentry concurrently. A read/write operation is performed upon the data memory 14 when a data request in each of the hit DRQ queues 107_1-107_4 is accepted by the data interconnect scheduling device 109.

As known to those skilled in the pertinent art, additional cache memory manipulation may be needed when a cache miss event occurs. For example, based on a replacement policy employed, a dirty cache line may be selected to be replaced. The data originally stored in the dirty cache line should be written back to a main memory. In this embodiment, when a tag miss of one scheduled address request occurs and a dirty cache line is decided to be replaced, the miss DRQ queue 108 is used to store a read data request Rentry and/or a write data request Wentry generated in response to the tag miss. For example, when there is a tag miss of a write address request and one of dirty cache lines is selected to be replaced, the selected dirty cache line needs to be read before the data write for replacement could happen. The data read of the selected dirty cache line goes to a miss read queue in the miss DRQ queue 108. The data read of the selected dirty cache line needs to be done before data write of the selected dirty cache line gets granted. Hence, when the cache line to be replaced is not dirty, data write can be performed upon the data memory 14 after a write data request in the miss DRQ queue 108 is accepted by the data interconnect scheduling device 109.

For another example, when there is a tag miss of a read address request, the requested data should be fetched from a main memory. However, before the requested data is read from the main memory, a cache line in the data memory 14 should be allocated to store the fetched data from the main memory. If one of dirty cache lines is selected to be replaced, one read data request is added to a miss read queue in the miss DRQ queue 108 to read the data originally stored in the selected dirty cache line. Hence, the data originally stored in the selected dirty cache line is read and then written back to the main memory. When the fetched data comes back from the main memory, a write data request is added to a miss write queue in the miss DRQ queue 108. Hence, the fetched data is written into the data memory 14 after the write data request in the miss write queue of the miss DRQ queue 108 is accepted by the data interconnect scheduling device 109.

Considering a worst case where the hit rate is low (e.g., 50%), it is possible that two successive requests may include one request with cache hit and the other request with cache miss. As shown in FIG. 1, four hit DRQ queues 107_1-107_4 may have four read data requests and four write data requests concurrently waiting to be accepted by the data interconnect scheduling device 109. If the miss DRQ queue 108 is designed to only have a single channel for allowing one read data request and one write data request to concurrently wait to be accepted by the data interconnect scheduling device 109, congestion of read data requests and write data requests would occur inside the miss DRQ queue 108 under the worst case due to the fact that the maximum number of data requests at the output nodes of the hit DRQ queues 107_1-107_4 is four times as large as the maximum number of data requests at the output nodes of the miss DRQ queue 108. To mitigate this congestion problem, the present invention proposes configuring the miss DRQ queue 108 to have more channels (e.g., two channels), such that the miss DRQ queue 108 is allowed to have two read data requests and two write data requests concurrently waiting to be accepted by the data interconnect scheduling device 109, which leads to an increased possibility of accepting the data requests at the miss DRQ queue 108.

Figure 9:
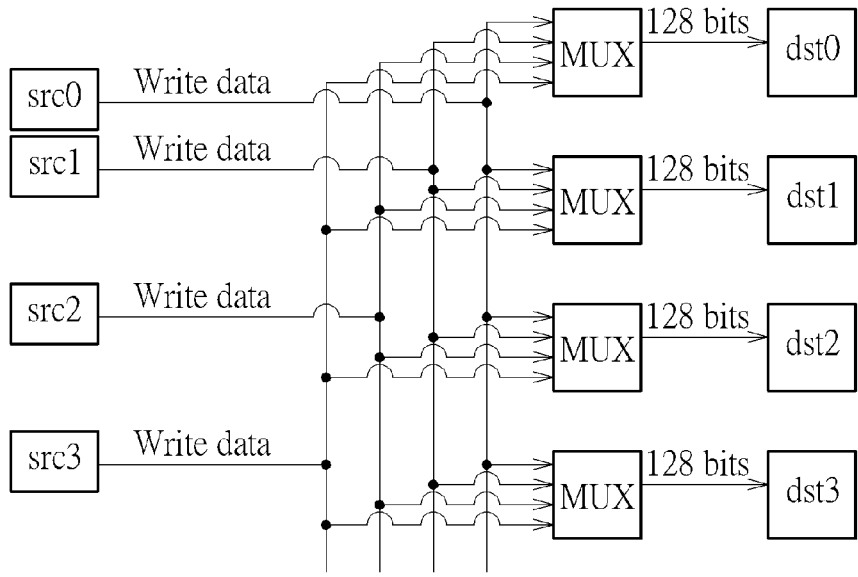
FIG. 9 is a diagram illustrating a write data XBAR switch in the data interconnect scheduling device shown in FIG. 1.
Figure 10:
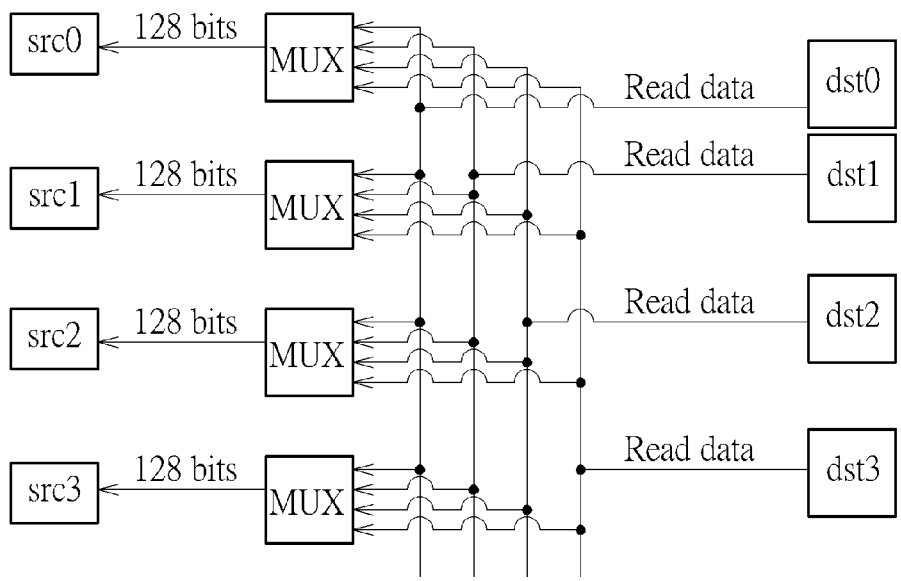
FIG. 10 is a diagram illustrating a read data XBAR switch in the data interconnect scheduling device shown in FIG. 1.

As shown in FIG. 1, the hit DRQ queues 107_1-107_4 and the miss DRQ queue 108 may have data requests waiting to be granted for accessing the data memory 14. The data interconnect scheduling device 109 is therefore arranged to perform a data bank arbitration to schedule data requests, including read data requests and write data requests, to the data banks 15_1-15_4 in the data memory 14. In this embodiment, the data interconnect scheduling device 109 may be implemented using a crossbar (XBAR) structure. FIG. 9 is a diagram illustrating a write data XBAR switch in the data interconnect scheduling device 109 shown in FIG. 1. FIG. 10 is a diagram illustrating a read data XBAR switch in the data interconnect scheduling device 109 shown in FIG. 1. As the data interconnect scheduling device 109 separates read data processing and write data processing, the read data XBAR switch and the write data XBAR switch can be both active at the same time, where each of the multiplexers (MUXs) in FIG. 9 and FIG. 10 is controlled by data scheduling. As shown in FIG. 9, each of the MUXs has a plurality of input ports coupled to a plurality of source devices (e.g., src0, src1, src2, and src3), respectively, and further has one output port coupled to a corresponding destination device (e.g., dst0, dst1, dst2, or dst3). Thus, by properly controlling the MUXs based on write data scheduling, one destination device can receive one write data from one of the source devices. As shown in FIG. 10, each of the MUXs has a plurality of input ports coupled to a plurality of destination devices (e.g., dst0, dst1, dst2, and dst3), respectively, and further has one output port coupled to a corresponding source device (e.g., src0, src1, src2, or src3). Thus, by properly controlling the MUXs based on read data scheduling, one source device can receive one read data from one of the destination devices. However, this is for illustrative purposes only, and is not meant to be a limitation of the present invention. That is, the data interconnect scheduling device 109 may be implemented using other interconnect structure.

In some simple designs of the present invention, it is possible that the data interconnect scheduling device 109 can directly refer to a scheduling decision of address requests made by the address interconnect scheduling device 104 to schedule the data requests in the hit DRQ queues 107_1-107_4 and the miss DRQ queue 108. More specifically, there is a fixed one-to-one relation between the tag banks 13_1-13_4 and the data banks 15_1-15_4. For example, when an address request is scheduled to the tag bank 13_1 for tag matching test, a corresponding "hit"/"miss" data request is always scheduled to the data bank 15_1 for data access; when an address request is scheduled to the tag bank 13_2 for tag matching test, a corresponding "hit"/"miss" data request is always scheduled to the data bank 15_2 for data access; when an address request is scheduled to the tag bank 13_3 for tag matching test, a corresponding "hit"/"miss" data request is always scheduled to the data bank 15_3 for data access; and when an address request is scheduled to the tag bank 13_4 for tag matching test, a corresponding "hit"/"miss" data request is always scheduled to the data bank 15_4 for data access. Hence, based on the address scheduling result, the data interconnect scheduling device 109 can easily decide which data bank the data request should go to.

In some designs of the present invention, the interconnect data width is configured to be 128 bits. Hence, the transaction between the data interconnect scheduling device 109 and the data memory 14 for a data request is 128 bits per cycle. Thus, multiple cycles are required to read or write one cache line with a line size equal to 512 bits or 1K bits. To serve a read data request and a write data request simultaneously, one exemplary design is to implement each data bank of the data memory 14 by using a two-port memory such as a 1R1W1028×128 SRAM.

However, two-port SRAM has larger gate count and more power consumption than a single-port SRAM. In another exemplary design, each data bank of the data memory 14 may be implemented by using a single-port memory such as a 1RW512×256 SRAM, and one address request could be associated with a data request of multiple data with a burst length. Because the burst length is equal to at least 2, one read operation or one write operation can support up to 2 cycles. In a current cycle (e.g., an even cycle), a data bank of the data memory 14 may serve the read operation; and in a next cycle (e.g., an odd cycle), the data bank of the data memory 14 may serve the write operation. Since an address request could have a burst length of data (i.e., one address could come with multiple data entries), the address scheduling could have a less tight bandwidth.

In yet another exemplary design, each data bank of the data memory 14 may be implemented by using two single-port memories such as two 1RW512×128 SRAMs, and one address request could be associated with a data quest of multiple data with a burst length. Regarding each data bank, two single-port SRAMs would act as two sub-banks, including one even sub-bank and one odd sub-bank. Using sub-banking may save power due to the fact that all of the databank is not required to be active when a data request is to access one of the sub-banks only.

Figure 11:
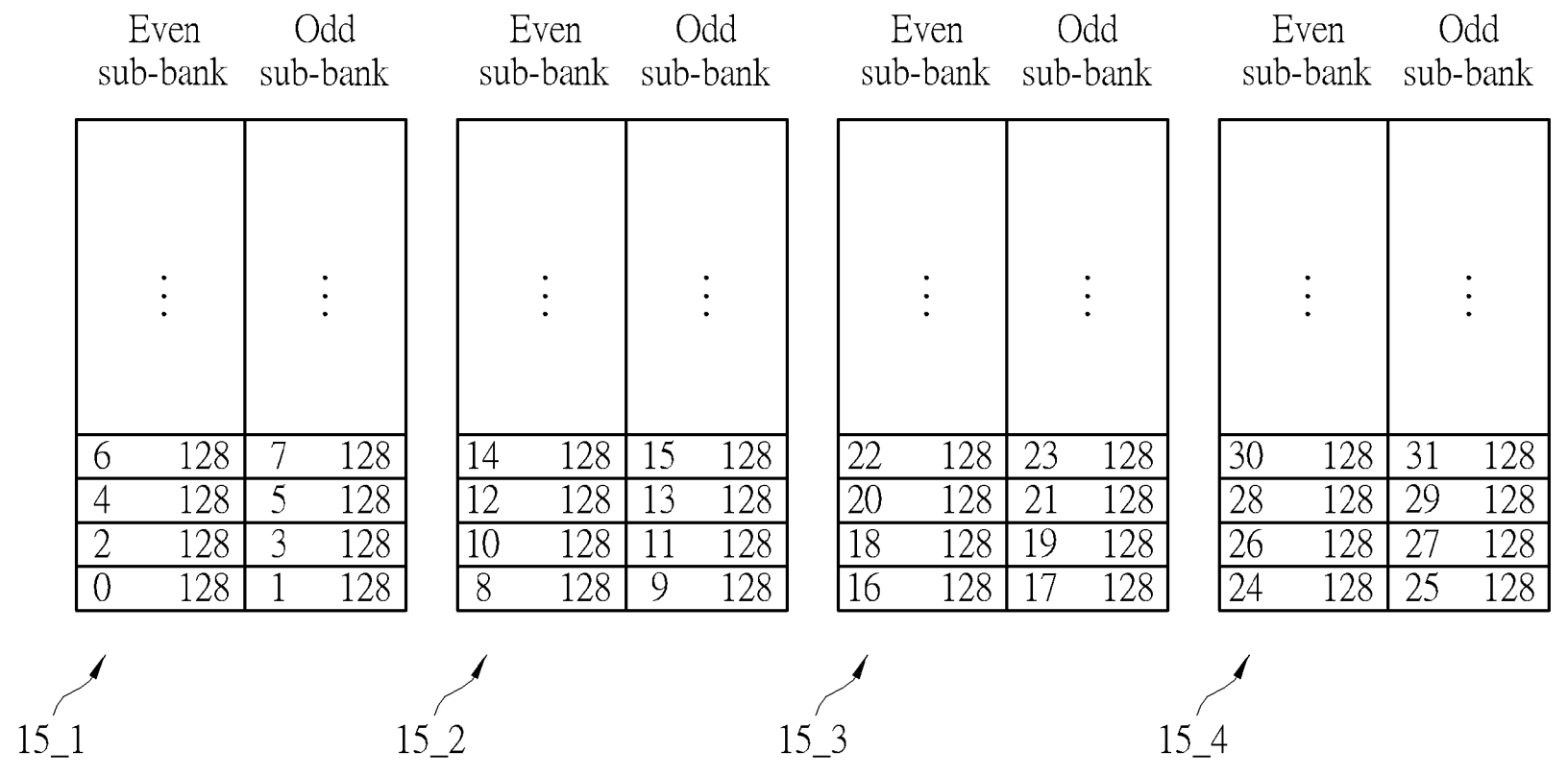

FIG. 11 is a diagram illustrating a first layout of stored data in data banks 15_1-15_4 of the data memory 14 according to an embodiment of the present invention. In a case where each sub-bank is implemented using one 1RW512×128 SRAM, the data memory 14 would need 4×2×1RW512×128 SRAMs. Assume that one cache line has a line size equal to 1K bits, that is, 8×128 bits. In this embodiment, a serial data layout per bank is employed. Therefore, the same cache line is fully in the same data bank, and one tag bank is always associated with the same data bank. As shown in FIG. 11, the $0^{th}$-$7^{th}$ 128-bit data segments form one cache line data, the $8^{th}$-$15^{th}$ 128-bit data segments form one cache line data, the $16^{th}$-$23^{rd}$ 128-bit data segments form one cache line data, and the $24^{th}$-$31^{st}$ 128-bit data segments form one cache line data. Further, when the serial data layout is employed, the aforementioned scheme of referring to the address scheduling result to decide the scheduling/arbitration of the data requests at the data interconnect scheduling device 109 may be employed.

Further, since the burst length is equal to at least 2, one read operation or one write operation can support up to 2 cycles. For example, in a current cycle (e.g., an even cycle), an even sub-bank of a data bank of the data memory 14 may serve the read operation, and an odd sub-bank of the data bank of the data memory 14 may serve the write operation; and in a next cycle (e.g., an odd cycle), the odd sub-bank of the data bank of the data memory 14 may serve the write operation, and the even sub-bank of the data bank of the data memory 14 may serve the read operation. For example, if a read operation is reading the $0^{th}$ 128-bit data segment in the even sub-bank of the data bank 15_1, at the same time, a write operation may write either the $1^{st}$ 128-bit data segment, or the $3^{rd}$ 128-bit data segment, or the $5^{th}$ 128-bit data segment, or the $7^{st}$ 128-bit data segment in the odd sub-bank of the data bank 15_1.

Figure 12:
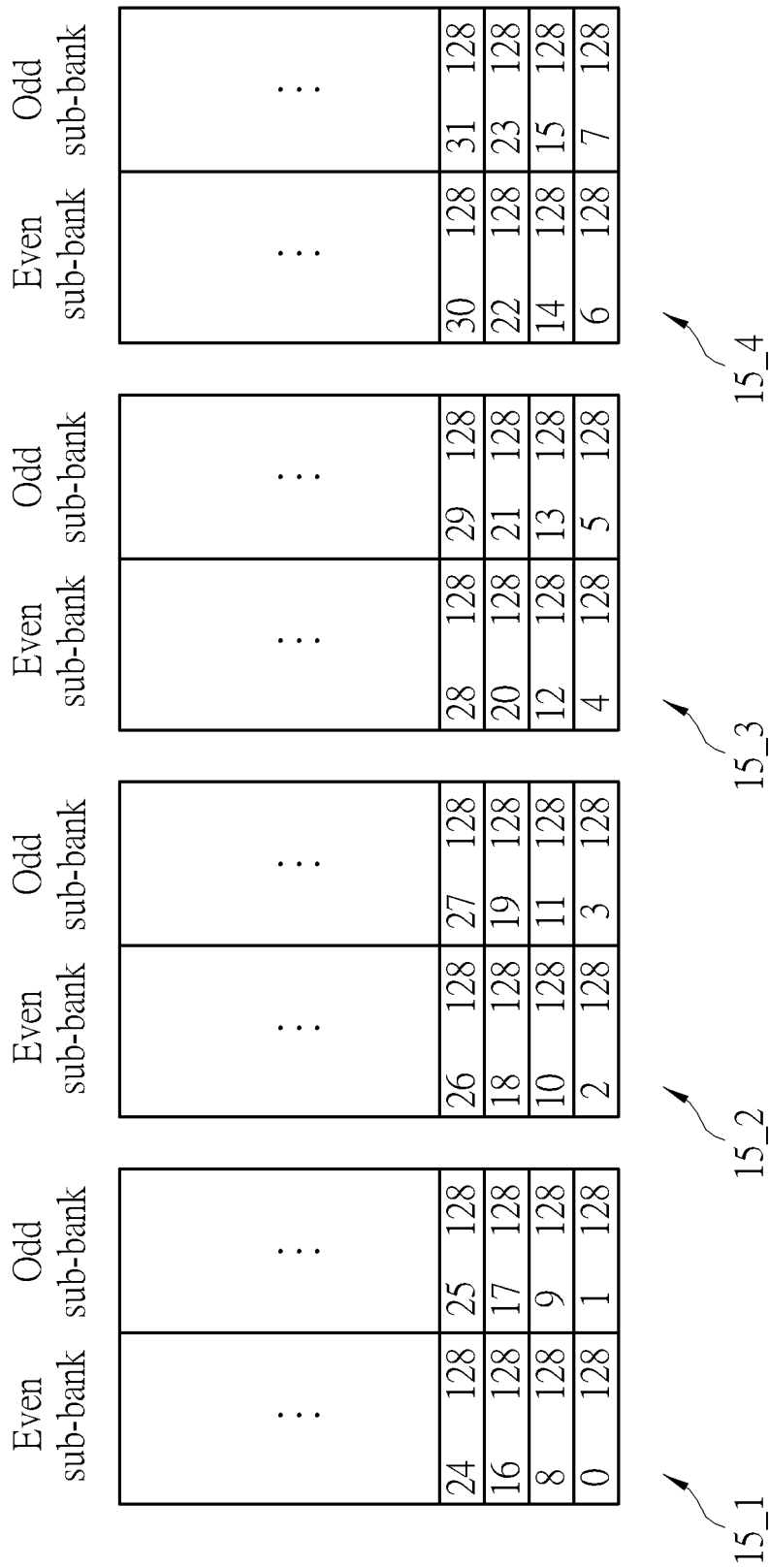
FIG. 12 is a diagram illustrating a second layout of stored data in data banks of the data memory according to an embodiment of the present invention.

FIG. 12 is a diagram illustrating a second layout of stored data in data banks 15_1-15_4 of the data memory 14 according to an embodiment of the present invention. In a case where each sub-bank is implemented using one 1RW512×128 SRAM, the data memory 14 would need 4×2×1RW512×128 SRAMs. Assume that one cache line has a line size equal to 1K bits, that is, 8×128 bits. In this embodiment, a parallel data layout per bank is employed. Therefore, one cache line is divided into multiple segments stored in different data banks, and one tag bank is associated with different data banks As shown in FIG. 12, the $0^{th}$-$7^{th}$ 128-bit data segments form one cache line data, the $8^{th}$-$15^{th}$ 128-bit data segments form one cache line data, the $16^{th}$-$23^{rd}$ 128-bit data segments form one cache line data, and the $24^{th}$-$31^{st}$ 128-bit data segments form one cache line data. That is, one cache line would cross multiple data banks for parallel processing on the same cache line. An address request could be in one tag bank, but the corresponding data is spread in multiple data banks. The address scheduling for dispatching address requests to tag banks cannot be the data scheduling of dispatching data requests to the data banks because the tag banks are not tied to the data banks in a one-to-one manner. Hence, in accordance with the parallel data layout, another data scheduling is calculated and decided by the data interconnect scheduling device 109. Specifically, when there is a cache hit or cache miss for an address request, extra data requests are needed to access multiple data banks due to the parallel data layout.

Further, since the burst length is equal to at least 2, one read operation or one write operation can support up to 2 cycles. For example, in a current cycle (e.g., an even cycle), an even sub-bank of a data bank of the data memory 14 may serve the read operation, and an odd sub-bank of the data bank of the data memory 14 may serve the write operation; and in a next cycle (e.g., an odd cycle), the odd sub-bank of the data bank of the data memory 14 may serve the write operation, and the even sub-bank of the data bank of the data memory 14 may serve the read operation. For example, if a read operation is reading the $0^{th}$ 128-bit data segment in the even sub-bank of the data bank 15_1, at the same time, a write operation may write either the $1^{st}$ 128-bit data segment, or the $9^{th}$ 128-bit data segment, or the $17^{th}$ 128-bit data segment, or the $25^{th}$ 128-bit data segment in the odd sub-bank of the data bank 15_1.

It should be noted that, no matter whether the data memory 14 employs the parallel data layout or the serial data layout, the cache line data return of a read request (e.g., 128-bit data segments of a requested cache line) could be in order (e.g., 0→1→2 ... →7) or out of order (e.g., 4→1→7 ... →0), depending upon actual design requirement.

With the above-mentioned implementation, the proposed multi-hierarchy interconnect system is capable of saving chip area and power when compared with the conventional interconnect designs. The interconnect hardware, including interconnect fabric for read operation and interconnect fabric for write operation, is fully utilized. Especially in throughput or graphic computing system, the read and write addresses will hardly have a RAW hazard condition within around 10 cycles of the interconnect latency time. Most of time, the proposed multi-hierarchy interconnect system has a full bandwidth for read operation and write operation performed concurrently.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A multi-hierarchy interconnect system for a cache system having a tag memory and a data memory, comprising:
   an address interconnect scheduling device, arranged to perform a tag bank arbitration to schedule address requests to a plurality of tag banks of the tag memory before a tag matching test; and
   a data interconnect scheduling device, arranged to perform a data bank arbitration to schedule data requests to a plurality of data banks of the data memory after the tag matching test.

2. The multi-hierarchy interconnect system of claim 1, wherein at least one of the address requests is associated with a data request of multiple data with a burst length.

3. The multi-hierarchy interconnect system of claim 1, wherein the data interconnect scheduling device refers to a scheduling decision of the address requests that is made by the address interconnect scheduling device to schedule the data requests.

4. The multi-hierarchy interconnect system of claim 1, further comprising:
   a tag matching device, arranged to apply the tag matching test to a first address request scheduled to a first tag bank of the tag banks and apply the tag matching test to a second address request scheduled to a second tag bank of the tag banks, independently.

5. The multi-hierarchy interconnect system of claim 1, wherein the address requests include read address requests and write address requests, and the address interconnect scheduling device is further arranged to balance read address requests and write address requests scheduled to a same tag bank.

6. The multi-hierarchy interconnect system of claim 1, further comprising:
   a tag matching device, arranged to apply the tag matching test to each of the scheduled address request outputted from the address interconnect scheduling device;
   wherein when a tag miss of one scheduled address request occurs and a dirty cache line is decided to be replaced, the data interconnect scheduling device is further arranged to schedule at least one data request generated in response to the tag miss.

7. The multi-hierarchy interconnect system of claim 1, wherein the data memory is divided into a plurality of sections, and the multi-hierarchy interconnect system further comprises:
   an arbiter device, having a plurality of input ports, wherein the arbiter device maps address requests received from a first input port of the input ports to a first section of the sections, and maps address requests received from a second input port of the input ports to a second section of the sections.

8. The multi-hierarchy interconnect system of claim 7, wherein the first section and the second section have different layouts for stored data.

9. The multi-hierarchy interconnect system of claim 7, wherein section sizes of the sections are programmable.

10. The multi-hierarchy interconnect system of claim 1, wherein the address requests include read address requests and write address requests; and the address interconnect scheduling device is arranged to perform one tag bank arbitration to schedule the read address requests and perform another tag bank arbitration to schedule the write address requests, independently.

11. The multi-hierarchy interconnect system of claim 10, wherein each of the data banks has two sub-banks, and the sub-banks serve a read operation corresponding to one read address request and a write operation corresponding to one write address request in parallel.

12. The multi-hierarchy interconnect system of claim 11, wherein data return for a read operation corresponding to one read address request is in order.

13. The multi-hierarchy interconnect system of claim 11, wherein data return for a read operation corresponding to one read address request is out of order.

14. The multi-hierarchy interconnect system of claim 10, further comprising:
   an arbiter device, arranged to arbitrate incoming address requests to output the address requests to be scheduled by the address interconnect scheduling device, wherein the arbiter device comprises:
   a plurality of arbiter modules, each having a plurality of input ports and comprising:
      a plurality of address queues, including a read address queue and a write address queue; and
      a plurality of arbiters, comprising:
         a read arbiter, arranged to arbitrate and store each incoming read address request into the read address queue; and
         a write arbiter, arranged to arbitrate and store each incoming write address request into the write address queue.

15. The multi-hierarchy interconnect system of claim 14, wherein at least one of the address queues comprises:
   a plurality of queues, corresponding to the data banks respectively, wherein each of the queues is arranged to store address requests for data access of a same data bank only.

16. The multi-hierarchy interconnect system of claim 14, wherein concerning at least one of the address queues, a corresponding arbiter is further arranged to maintain a plurality of linked lists corresponding to the data banks respectively; and stored address requests for data access of a same data bank in the at least one of the address queues are pointed to by pointers included in a corresponding linked list.

17. The multi-hierarchy interconnect system of claim 14, wherein the read arbiter is further arranged to detect if there are a read address request of a received read request and a write address request of a granted write request having a same address value; and when it is detected that the read address request of the received read request and the write address request of the granted write request have the same address value, the read arbiter is further arranged to block the read address request from being scheduled by the address interconnect scheduling device until a write operation for serving the granted write request is completed.

18. The multi-hierarchy interconnect system of claim 14, wherein the arbiters arbitrate the incoming address requests into the address queues based on at least one of traffic condition of the data banks and storage condition of the address queues.

19. The multi-hierarchy interconnect system of claim 14, wherein at least one of the arbiters assigns weighting values to the input ports, and arbitrates address requests received at the input ports based on the weighting values.

20. A multi-hierarchy interconnect method for a cache system having a tag memory and a data memory, comprising:
  performing a tag bank arbitration to schedule address requests to a plurality of tag banks of the tag memory before a tag matching test; and
  performing a data bank arbitration to schedule data requests to a plurality of data banks of the data memory after the tag matching test.

\* \* \* \* \*